US011270306B2

(12) United States Patent
Yan

(10) Patent No.: US 11,270,306 B2
(45) Date of Patent: Mar. 8, 2022

(54) ASSET MANAGEMENT METHOD AND APPARATUS, AND ELECTRONIC DEVICE

(71) Applicant: Advanced New Technologies Co., Ltd., George Town (KY)

(72) Inventor: Xuebing Yan, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 285 days.

(21) Appl. No.: 16/275,444

(22) Filed: Feb. 14, 2019

(65) Prior Publication Data
US 2019/0251563 A1    Aug. 15, 2019

(30) Foreign Application Priority Data
Feb. 14, 2018    (CN) .......................... 201810151606.3

(51) Int. Cl.
| | | |
|---|---|---|
| *G06Q 20/40* | (2012.01) | |
| *G06F 16/23* | (2019.01) | |
| *H04L 9/14* | (2006.01) | |
| *H04L 9/32* | (2006.01) | |

(52) U.S. Cl.
CPC .......... *G06Q 20/401* (2013.01); *G06F 16/23* (2019.01); *H04L 9/14* (2013.01); *H04L 9/3239* (2013.01); *G06Q 2220/00* (2013.01); *H04L 2209/38* (2013.01); *H04L 2209/56* (2013.01)

(58) Field of Classification Search
CPC .. G06Q 20/401; G06Q 2220/00; G06F 16/23; H04L 9/14; H04L 9/3239; H04L 2209/38; H04L 2209/56
See application file for complete search history.

(56) References Cited

U.S. PATENT DOCUMENTS

| | | | |
|---|---|---|---|
| 8,832,059 | B2 | 9/2014 | Baran |
| 9,342,697 | B1 | 5/2016 | Ren et al. |
| 10,102,082 | B2 | 10/2018 | Cabrera et al. |
| 10,204,349 | B2 | 2/2019 | McCauley et al. |
| 10,564,820 | B1 | 2/2020 | Cabanero et al. |

(Continued)

FOREIGN PATENT DOCUMENTS

| | | |
|---|---|---|
| CN | 106549749 | 3/2017 |
| CN | 106656974 | 5/2017 |

(Continued)

OTHER PUBLICATIONS

U.S. Appl. No. 16/275,403, Yan, filed Feb. 14, 2019.

(Continued)

*Primary Examiner* — Jamie R Kucab
(74) *Attorney, Agent, or Firm* — Fish & Richardson P.C.

(57) ABSTRACT

This specification describes techniques for managing assets in a blockchain. One example method includes receiving, from a target user recorded in a distributed database of a blockchain network, a user input including a request to transfer an asset object including a digital asset corresponding to a physical asset associated with the target user, in response to receiving the request, determining a contract object based on an asset type of the asset object, processing the asset object using the contract object to generate a plurality of target objects, deleting address information from the plurality of target objects, and adding the address information to asset receiving objects corresponding to the plurality of target objects.

20 Claims, 4 Drawing Sheets

(56) References Cited

U.S. PATENT DOCUMENTS

| | | |
|---|---|---|
| 2002/0109737 A1 | 8/2002 | Jaeger |
| 2003/0233370 A1 | 12/2003 | Barabas et al. |
| 2008/0320024 A1 | 12/2008 | Thirumalai et al. |
| 2014/0279942 A1 | 9/2014 | Siepmann et al. |
| 2015/0244690 A1 | 8/2015 | Mossbarger |
| 2015/0262176 A1 | 9/2015 | Langschaedel et al. |
| 2015/0379510 A1 | 12/2015 | Smith |
| 2016/0012424 A1 | 1/2016 | Simon et al. |
| 2016/0151715 A1 | 6/2016 | Polansky et al. |
| 2016/0196324 A1 | 7/2016 | Haviv et al. |
| 2016/0283920 A1 | 9/2016 | Fisher et al. |
| 2016/0292672 A1 | 10/2016 | Fay et al. |
| 2017/0005804 A1* | 1/2017 | Zinder ............... G06F 21/6254 |
| 2017/0033932 A1 | 2/2017 | Truu et al. |
| 2017/0048209 A1 | 2/2017 | Lohe et al. |
| 2017/0048235 A1 | 2/2017 | Lohe et al. |
| 2017/0063671 A1* | 3/2017 | Gandhi ................. H04L 45/22 |
| 2017/0103468 A1 | 4/2017 | Orsini et al. |
| 2017/0116693 A1 | 4/2017 | Rae et al. |
| 2017/0132630 A1 | 5/2017 | Castinado et al. |
| 2017/0161733 A1 | 6/2017 | Koletsky et al. |
| 2017/0221052 A1* | 8/2017 | Sheng ............... G06Q 20/3829 |
| 2017/0232300 A1 | 8/2017 | Tran et al. |
| 2017/0286880 A1 | 10/2017 | Wiig et al. |
| 2017/0315882 A1 | 11/2017 | Yammine et al. |
| 2017/0344987 A1 | 11/2017 | Davis et al. |
| 2017/0353309 A1 | 12/2017 | Gray |
| 2018/0005186 A1 | 1/2018 | Hunn |
| 2018/0018723 A1 | 1/2018 | Nagla et al. |
| 2018/0075527 A1 | 3/2018 | Nagla et al. |
| 2018/0089183 A1 | 3/2018 | Schwartz et al. |
| 2018/0089256 A1 | 3/2018 | Wright, Sr. |
| 2018/0089761 A1 | 3/2018 | Stradling et al. |
| 2018/0091514 A1 | 3/2018 | Schwartz et al. |
| 2018/0167198 A1 | 6/2018 | Muller et al. |
| 2018/0241546 A1 | 8/2018 | Leng et al. |
| 2018/0253702 A1 | 9/2018 | Dowding |
| 2018/0309567 A1 | 10/2018 | Wooden |
| 2018/0329693 A1 | 11/2018 | Eksten et al. |
| 2018/0330342 A1 | 11/2018 | Prakash et al. |
| 2019/0013948 A1 | 1/2019 | Mercuri et al. |
| 2019/0026821 A1 | 1/2019 | Bathen et al. |
| 2019/0036906 A1 | 1/2019 | Biyani et al. |
| 2019/0080402 A1 | 3/2019 | Molinari et al. |
| 2019/0122155 A1* | 4/2019 | Irazabal ........... G06Q 10/06311 |
| 2019/0147431 A1* | 5/2019 | Galebach ............ H04L 9/3247 705/44 |
| 2019/0164153 A1 | 5/2019 | Agrawal et al. |
| 2019/0172298 A1 | 6/2019 | Just |
| 2019/0222567 A1 | 7/2019 | Caldera et al. |
| 2019/0228386 A1 | 7/2019 | Onnainty |
| 2019/0236598 A1 | 8/2019 | Padmanabhan |
| 2019/0236606 A1 | 8/2019 | Padmanabhan et al. |
| 2019/0238316 A1 | 8/2019 | Padmanabhan |
| 2019/0238525 A1 | 8/2019 | Padmanabhan et al. |
| 2019/0251075 A1 | 8/2019 | Yan |
| 2019/0251076 A1 | 8/2019 | Yan |
| 2019/0251078 A1 | 8/2019 | Yan |
| 2019/0251079 A1 | 8/2019 | Yan |
| 2019/0253257 A1 | 8/2019 | Yan |
| 2019/0303579 A1 | 10/2019 | Reddy et al. |
| 2019/0377806 A1 | 12/2019 | Padmanabhan et al. |
| 2020/0034127 A1 | 1/2020 | Burrowes et al. |
| 2020/0037158 A1 | 1/2020 | Soundararajan et al. |
| 2020/0051176 A1 | 2/2020 | Liu et al. |
| 2020/0126079 A1 | 4/2020 | Yan |

FOREIGN PATENT DOCUMENTS

| | | |
|---|---|---|
| CN | 106780025 A | 5/2017 |
| CN | 106790253 A | 5/2017 |
| CN | 106815764 | 6/2017 |
| CN | 106845960 | 6/2017 |
| CN | 106874087 | 6/2017 |
| CN | 107145768 | 9/2017 |
| CN | 107220820 | 9/2017 |
| CN | 107239940 | 10/2017 |
| CN | 107273759 | 10/2017 |
| CN | 107301536 | 10/2017 |
| CN | 107615317 | 1/2018 |
| JP | 2018014567 A | 1/2018 |
| JP | 2019511150 A | 4/2019 |
| KR | 101751025 B1 | 6/2017 |
| TW | M543413 | 6/2017 |
| TW | 201732666 | 9/2017 |
| TW | 201732705 | 9/2017 |
| TW | 201732706 | 9/2017 |
| TW | 201741955 | 12/2017 |
| TW | 201800997 | 1/2018 |
| TW | M555500 | 2/2018 |
| WO | WO 2017091530 | 6/2017 |
| WO | 2017145007 A1 | 8/2017 |
| WO | WO 2017161417 | 9/2017 |
| WO | 2017170997 A1 | 10/2017 |
| WO | WO 2017190175 | 11/2017 |
| WO | WO 2017223470 | 12/2017 |

OTHER PUBLICATIONS

U.S. Appl. No. 16/724,642, Yan, filed Dec. 23, 2019.
U.S. Appl. No. 16/275,440, Yan, filed Feb. 14, 2019.
U.S. Appl. No. 16/725,236, Yan, filed Dec. 23, 2019.
U.S. Appl. No. 16/275,505, Yan, filed Feb. 14, 2019.
U.S. Appl. No. 16/725,918, Yan, filed Dec. 23, 2019.
U.S. Appl. No. 16/275,811, Yan, filed Feb. 14, 2019.
U.S. Appl. No. 16/723,313, Yan, filed Dec. 20, 2019.
U.S. Appl. No. 16/275,868, Yan, filed Feb. 14, 2019.
U.S. Appl. No. 16/725,686, Yan, filed Dec. 23, 2019.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
binance.vision [online], "Proof of Burn Explained", Binance Academy, 2017, retrieved on Feb. 23, 2020, retrieved from URL <https://www.binance.vision/ja/blockchain/proof-of-burn-explained>, 7 pages (with partial English translation).
International Search Report and Written Opinion in International Application No. PCT/US2019/017946, dated May 7, 2019, 11 pages.
International Search Report and Written Opinion in International Application No. PCT/US2019/017951, dated May 14, 2019, 7 pages.
International Search Report and Written Opinion in International Application No. PCT/US2019/017956, dated May 14, 2019, 7 pages.
International Search Report and Written Opinion in International Application No. PCT/US2019/017958, dated May 1, 2019, 8 pages.
International Search Report and Written Opinion in International Application No. PCT/US2019/017980, dated May 2, 2019, 9 pages.
International Search Report and Written Opinion in International Application No. PCT/US2019/017986, dated May 1, 2019, 9 pages.
Chen et al., "Blockchain-based Payment Collection Supervision System using Pervasive Bitcoin Digital Wallet," Fifth International Workshop on Pervasive and Contect-Aware Middleware, Oct. 2017, 8 pages.
PCT International Preliminary Report on Patentability in International Application No. PCT/US2019/017956, dated Aug. 27, 2020, 7 pages.
blog.alyac.co.kr [online], "Blockchain, I want to know," Mar. 4, 2016, retrieved from URL <https://blog.alyac.co.kr/558>, 15 pages (with English Machine translation).

* cited by examiner

ASSET MANAGEMENT METHOD AND APPARATUS, AND ELECTRONIC DEVICE

CROSS-REFERENCE TO RELATED APPLICATIONS

This application claims priority to Chinese Patent Application No. 201810151606.3, filed on Feb. 14, 2018, which is hereby incorporated by reference in its entirety.

TECHNICAL FIELD

One or more implementations of the present specification relate to the field of blockchain technologies, and in particular, to an asset management method and apparatus, and an electronic device.

BACKGROUND

A blockchain technology is an emerging technology that several computing devices jointly participate in "accounting" and jointly maintain a complete distributed database. The blockchain technology is characterized by decentralization and transparency, and in the blockchain technology, each computing device can participate in database recording, and can quickly perform data synchronization. Therefore, the blockchain technology is used to set up decentralized systems, and collect various execution programs in a distributed database of a blockchain for automatic execution. The blockchain technology has been widely used in many fields. For example, in the field of financial technologies, the blockchain technology is used to set up P2P payment platforms, and deploy execution programs such as smart contracts in the blockchain, so that secure point-to-point payment between different users can be implemented without using financial institutions such as banks.

SUMMARY

The present specification provides an asset management method, including: receiving, by a node device in a blockchain, an asset object transfer request, where the asset object transfer request includes an asset object to be transferred; and in response to the asset object transfer request, invoking a contract object that corresponds to an asset type of the asset object to be transferred and that is deployed in the blockchain, splitting the asset object to be transferred into a plurality of target asset objects, removing address information of the asset object to be transferred from a target object holding the asset object to be transferred, and adding address information of the plurality of target asset objects to asset receiving objects corresponding to the plurality of target asset objects.

Optionally, the contract object declares an execution program and a splitting rule used to split an asset object; and the invoking a contract object that corresponds to an asset type of the asset object to be transferred and that is deployed in the blockchain, and splitting the asset object to be transferred into a plurality of target asset objects includes: invoking the execution program declared in the contract object that corresponds to the asset type of the asset object and that is deployed in the blockchain, and splitting the asset object to be transferred into the plurality of target asset objects based on the splitting rule.

Optionally, the contract object declares an execution program and a splitting rule used to split an asset object, and the asset object transfer request further includes a splitting result for the asset object to be transferred requested by a user; and the invoking a contract object that corresponds to an asset type of the asset object to be transferred and that is deployed in the blockchain, and splitting the asset object to be transferred into a plurality of target asset objects includes: invoking the execution program declared in the contract object that corresponds to the asset type of the asset object and that is deployed in the blockchain, and determining whether the splitting result for the asset object to be transferred requested by the user satisfies the splitting rule declared in the contract object; and if the splitting result satisfies the splitting rule declared in the contract object, splitting the asset object to be transferred into the plurality of target asset objects based on the splitting result requested by the user.

Optionally, the contract object declares an execution program used to transfer an asset object, and the asset object to be transferred is created by invoking the contract object; and the removing address information of the asset object to be transferred from a target object holding the asset object to be transferred, and adding address information of the plurality of target asset objects to asset receiving objects corresponding to the plurality of target asset objects includes: invoking the execution program declared in the contract object that corresponds to the asset type of the asset object to be transferred and that is deployed in the blockchain, and determining whether the asset object transfer request satisfies a predetermined transfer rule; and if the asset object transfer request satisfies the predetermined transfer rule, removing the address information of the asset object to be transferred from the target object holding the asset object to be transferred, and adding the address information of the plurality of target asset objects to the asset receiving objects corresponding to the plurality of target asset objects.

Optionally, an object supported by the blockchain includes an address field, and the address field is used to maintain address information of an asset object held by the object.

Optionally, the removing address information of the asset object to be transferred from a target object holding the asset object to be transferred, and adding address information of the plurality of target asset objects to asset receiving objects corresponding to the plurality of target asset objects includes: removing the address information of the asset object to be transferred from an address field in the target object holding the asset object to be transferred, and adding the address information of the plurality of target asset objects to address fields in the asset receiving objects corresponding to the plurality of target asset objects.

Optionally, an object supported by the blockchain further includes a code field, and the code field is used to maintain execution code related to an execution program declared in the object.

Optionally, the asset receiving objects corresponding to the plurality of target asset objects include: asset receiving objects that correspond to the plurality of target asset objects and that are specified by the user; or asset receiving objects that correspond to the plurality of target asset objects and that are declared in the contract object corresponding to the asset type of the asset object to be transferred.

Optionally, an object supported by the blockchain includes an account object, a contract object, and an asset object; and the asset receiving objects corresponding to the plurality of target asset objects include any one of an account object, a contract object, and an asset object.

Optionally, the blockchain is a consortium chain, and a target member in the blockchain is a consortium member having permission to create an asset object in the consortium chain.

The present specification further provides an asset management apparatus, including: a receiving module, configured to receive an asset object transfer request, where the asset object transfer request includes an asset object to be transferred; a splitting module, configured to: in response to the asset object transfer request, invoke a contract object that corresponds to an asset type of the asset object to be transferred and that is deployed in the blockchain, and split the asset object to be transferred into a plurality of target asset objects; and a transfer module, configured to remove address information of the asset object to be transferred from a target object holding the asset object to be transferred, and add address information of the plurality of target asset objects to asset receiving objects corresponding to the plurality of target asset objects.

Optionally, the contract object declares an execution program and a splitting rule used to split an asset object; and the splitting module is configured to: invoke the execution program declared in the contract object that corresponds to the asset type of the asset object and that is deployed in the blockchain, and split the asset object to be transferred into the plurality of target asset objects based on the splitting rule.

Optionally, the contract object declares an execution program and a splitting rule used to split an asset object, and the asset object transfer request further includes a splitting result for the asset object to be transferred requested by a user; and the splitting module is configured to: invoke the execution program declared in the contract object that corresponds to the asset type of the asset object and that is deployed in the blockchain, and determine whether the splitting result for the asset object to be transferred requested by the user satisfies the splitting rule declared in the contract object; and if the splitting result satisfies the splitting rule declared in the contract object, split the asset object to be transferred into the plurality of target asset objects based on the splitting result requested by the user.

Optionally, the contract object declares an execution program used to transfer an asset object, and the asset object to be transferred is created by invoking the contract object; and the transfer module is configured to: invoke the execution program declared in the contract object that corresponds to the asset type of the asset object to be transferred and that is deployed in the blockchain, and determine whether the asset object transfer request satisfies a predetermined transfer rule; and if the asset object transfer request satisfies the predetermined transfer rule, remove the address information of the asset object to be transferred from the target object holding the asset object to be transferred, and add the address information of the plurality of target asset objects to the asset receiving objects corresponding to the plurality of target asset objects.

Optionally, an object supported by the blockchain includes an address field, and the address field is used to maintain address information of an asset object held by the object.

Optionally, the transfer module is further configured to: remove the address information of the asset object to be transferred from an address field in the target object holding the asset object to be transferred, and add the address information of the plurality of target asset objects to address fields in the asset receiving objects corresponding to the plurality of target asset objects.

Optionally, an object supported by the blockchain further includes a code field, and the code field is used to maintain execution code related to an execution program declared in the object.

Optionally, the asset receiving objects corresponding to the plurality of target asset objects include: asset receiving objects that correspond to the plurality of target asset objects and that are specified by the user; or asset receiving objects that correspond to the plurality of target asset objects and that are declared in the contract object corresponding to the asset type of the asset object to be transferred.

Optionally, an object supported by the blockchain includes an account object, a contract object, and an asset object; and the asset receiving objects corresponding to the plurality of target asset objects include any one of an account object, a contract object, and an asset object.

Optionally, the blockchain is a consortium chain, and a target member in the blockchain is a consortium member having permission to create an asset object in the consortium chain.

The present specification further provides an electronic device, including: a processor; and a memory, configured to store a machine executable instruction, where by reading and executing a machine executable instruction that is stored in the memory and that corresponds to control logic of blockchain-based asset management, the processor is configured to: receive an asset object transfer request, where the asset object transfer request includes an asset object to be transferred; and in response to the asset object transfer request, invoke a contract object that corresponds to an asset type of the asset object to be transferred and that is deployed in the blockchain, split the asset object to be transferred into a plurality of target asset objects, remove address information of the asset object to be transferred from a target object holding the asset object to be transferred, and add address information of the plurality of target asset objects to asset receiving objects corresponding to the plurality of target asset objects.

In the described implementations, the contract object corresponding to the asset object to be transferred specified by the user is invoked, the asset object to be transferred is split into the plurality of target asset objects, the address information of the asset object to be transferred is removed from the target object holding the asset object to be transferred, and the address information of the plurality of target asset objects obtained through splitting is added to the receiving object holding the plurality of target asset objects, to transfer the target asset objects, so that assets in the real world can be converted into digital assets in a blockchain to hold, and the assets can be split and transferred online based on the blockchain.

DESCRIPTION OF IMPLEMENTATIONS

The present specification is intended to disclose a technical solution of completing asset object splitting and asset object transfer in a blockchain.

In implementation, a target member in the blockchain can deploy a contract object (smart contract) corresponding to an asset type of an asset object in the blockchain in advance. The created contract object is used for asset object management. A user accessing a blockchain can create an asset object on the blockchain by invoking the previous contract object, and complete online management on the held asset object in the blockchain.

When creating the asset object, the user accessing a blockchain can initiate an asset object creation request to the blockchain to invoke the previous contract object for asset object creation, and then add address information of the created asset object to a target object holding the asset object. For example, an execution program used to create an asset object can be declared in the contract object in advance, so that the asset object can be created by invoking the previous execution program used to create an asset object.

In addition, the user accessing a blockchain can initiate an asset object transfer request to the blockchain when the held asset object is transferred. After receiving the asset object transfer request, a node device in the blockchain can respond to the asset object transfer request, and split the asset object into a plurality of asset objects. After the asset object is split into the plurality of target asset objects, the node device can remove address information of the asset object from a target object holding the asset object, and add address information of the plurality of target asset objects obtained through splitting to asset receiving objects corresponding to the plurality of target asset objects, to complete online transfer of the asset object.

It can be learned from the described implementations that the contract object corresponding to the asset object to be transferred specified by the user is invoked, the asset object to be transferred is split into the plurality of target asset objects, the address information of the asset object to be transferred is removed from the target object holding the asset object to be transferred, and the address information of the plurality of target asset objects obtained through splitting is added to the receiving object holding the plurality of target asset objects, to transfer the target asset objects, so that assets in the real world can be converted into digital assets in a blockchain to hold, and the assets can be split and transferred online based on the blockchain.

The following describes the present specification with reference to specific application scenarios by using specific implementations.

Figure 1:
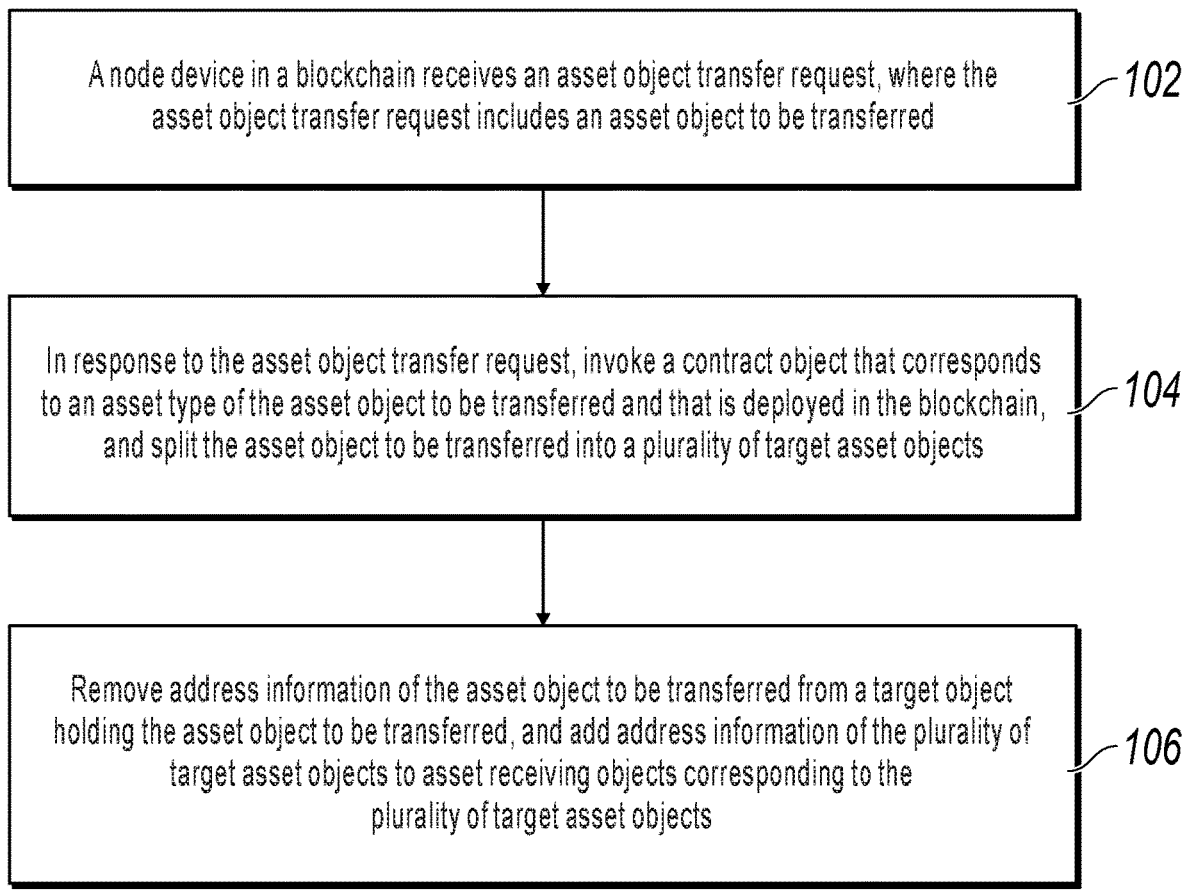
FIG. 1 is a flowchart illustrating an asset management method, according to an example implementation.

Referring to FIG. 1, FIG. 1 illustrates an asset management method according to an implementation of the present specification. The method is applied to a node device in a blockchain, to perform the following steps:

Step 102: A node device in a blockchain receives an asset object transfer request, where the asset object transfer request includes an asset object to be transferred.

Step 104: In response to the asset object transfer request, invoke a contract object that corresponds to an asset type of the asset object to be transferred and that is deployed in the blockchain, and split the asset object to be transferred into a plurality of target asset objects.

Step 106: Remove address information of the asset object to be transferred from a target object holding the asset object to be transferred, and add address information of the plurality of target asset objects to asset receiving objects corresponding to the plurality of target asset objects.

The blockchain described in the present specification can include any type of blockchain networks whose supported objects include an asset object.

For example, in a conventional blockchain, a supported object usually includes only an account object and a contract object. However, in the present specification, an object supported by the blockchain can be extended, and an asset object is provided in addition to the account object and the contract object currently supported by the blockchain.

A type of the blockchain described in the present specification is not particularly limited, and can be a consortium chain or a blockchain other than the consortium chain (for example, a private chain or a public chain).

The contract object can include a smart contract program that is deployed in the blockchain by a target member in the blockchain, recorded in a distributed database of the blockchain (namely, a ledger of the blockchain), and used to manage an asset object supported by the blockchain. A user accessing the blockchain can invoke the contract object to create an asset object in the blockchain, and complete online management of the held asset object in the blockchain.

For example, the blockchain can be a consortium chain including several financial institutions serving as consortium members. In this case, the target member in the blockchain can be a financial institution serving as a consortium member in the consortium chain and having permission to create an asset object. A distributed smart contract platform can be set up by using the consortium chain. An operator of the smart contract platform can extend an object supported by the smart contract platform, and an asset object is provided in addition to the currently supported account object and contract object, so that a financial institution serving as a consortium member can create a new asset type on the platform by releasing the smart contract (the contract object) in the blockchain. Therefore, the user accessing the blockchain can invoke the smart contract to create the asset object, and complete the online management of the held asset object.

A request initiated in the blockchain by the user accessing the blockchain can be a transfer used in the conventional blockchain.

For example, the user accessing the blockchain can initiate a transfer used to create an asset object in the blockchain, to invoke the contract object that has been deployed in the blockchain to create the asset object; or can initiate a transfer used to update a declare of an asset object in the blockchain, to invoke the contract object that has been deployed in the blockchain to update the declare of the asset object.

In some implementation, the request initiated in the blockchain by the user accessing the blockchain can be an instruction, message, etc. in a standard data structure other than the transfer, and is not particularly limited in the present specification. In the following implementations, description is provided by using an example that the request initiated in the blockchain by the user accessing the blockchain is the transfer.

The asset object can include a smart asset object, and the smart asset object is used to maintain smart assets. The smart assets correspond to any type of real assets of the user in the real world, and the smart assets can be processed in the blockchain by using the smart asset object. For example, the smart asset object can be processed by using the smart contract in the blockchain. The real assets of the user in the real world corresponding to the smart assets are not particularly limited in the present specification.

For example, assuming that the blockchain is the consortium chain including the several financial institutions, in actual applications, offline assets of the user such as funds, real properties, stocks, loan contracts, bills, and payment receivables can be packed in digital assets by a financial institution managing a node device in the consortium chain, and can be created and deployed in a distributed database of the consortium chain.

The following describes the technical solutions of the present specification in detail with reference to "blockchain object extension", "contract object deploy", "asset object creation", and "asset object splitting and transfer" by using specific implementations.

1) Blockchain Object Extension

In the present specification, when setting up a blockchain network, an operator of the blockchain can extend an object supported by the blockchain.

In a conventional blockchain (for example, Ethereum), an object supported by the blockchain usually includes an account object and a contract object. However, in the present specification, an object supported by the blockchain can be extended, and an asset object is provided in addition to the existing account object and contract object.

In other words, in the present specification, the object supported by the blockchain can include the account object, the contract object, and the asset object. As such, in addition to creating an account and a smart contract in the blockchain, the user accessing the blockchain can create digital assets in the blockchain, to convert assets in the real world into the digital assets deployed in the blockchain.

In an illustrated implementation, the object supported by the blockchain can still include the following four attribute fields: a balance field, a storage field, a code field, and a nonce field.

In the conventional blockchain (for example, Ethereum), the balance field (address field) usually indicates "balances", and is used to indicate the amount of money that the object has. However, in the present specification, the meaning of the balance field can be extended, and the balance field indicates address information used to maintain the asset object held by the object rather than "balances". In actual applications, the balance field can maintain address information of a plurality of asset objects.

In implementation, the account object, the contract object, and the asset object shown above can add address information of an asset object to the balance field, to hold the asset object corresponding to the address information. In other words, in the present specification, the asset object can hold virtual assets in addition to the account object and the contract object shown above.

The storage field is used to maintain various declares of the object (for example, an account declare, a contract declare, and an asset declare). For example, by using the asset object as an example, a financial institution releasing the asset object or another executor specified by the financial institution and having permission to update the asset object can update a declare of the asset object by modifying content in the storage field. For example, assuming that the asset object is a digital asset obtained by packing an offline loan contract asset of the user, when a regular loan performance declare of the user changes, the financial institution releasing the asset object or another executor specified by the financial institution and having permission to update the asset object can synchronously update the content in the storage field in the asset object corresponding to the digital assets as the regular loan performance declare of the user changes.

The code field is used to maintain execution code related to an execution program declared in the object (for example, various executable methods related to the code). In other words, in the present specification, the account object, the contract object, and the asset object shown above all can declare the related execution program in the object.

For example, by using the contract object used to manage the asset object as an example, any operation related to the asset object managed by the contract object can be declared in advance in the code field of the contract object in a form of the execution program. The execution program can be directly invoked subsequently to complete a corresponding operation. For example, the execution program declared in the contract object used to manage the asset object can usually include an execution program used to create an asset object, an execution program used to update an asset object, an execution program used to transfer an asset object, etc.

In addition to maintaining the execution code related to the execution program declared in the object, the code field can maintain an invoking address of the contract object, an invoking parameter that is to be transferred when the contract object is invoked, etc.

The nonce field is used to maintain count for preventing a reply attack from occurring in the blockchain. The count can be usually a random number or a pseudo-random number used to prevent the replay attack from occurring in the blockchain.

2) Contract Object Deploy

In an illustrated implementation, the blockchain can be a consortium chain including several financial institutions serving as consortium members. In this case, the target member in the blockchain can be a financial institution serving as a consortium member in the consortium chain and having permission to create an asset object.

A distributed smart contract platform can be set up by using the consortium chain, and the financial institution having permission to create an asset object in the consortium chain can create a new asset type on the platform by releasing the smart contract (the contract object) in the consortium chain.

In implementation, each financial institution in the consortium chain can be first registered as a consortium member of the consortium chain, to obtain a public key and a private key returned by the consortium chain. The public key is used as an account address of each financial institution in the consortium chain, and the private key is used as a unique key used by each financial institution to operate the account. Then, each financial institution joining the consortium chain can be authorized by the operator of the consortium chain to create the asset object. When being authorized to create the asset object, the financial institution can create and deploy a smart contract in the consortium chain based on actual requirements, to create a new asset type.

A specific process of releasing the smart contract by the financial institution in the consortium chain is not described in detail in the present specification, and a person skilled in the art can refer to descriptions in related technologies.

For example, in actual applications, the financial institution can deploy a transfer to the consortium chain based on the held private key, to deploy the created smart contract to the consortium chain. When receiving, by using a managed node device, a transfer deployed by another financial institution, each consortium member in the consortium chain can perform, based on a consensus algorithm of the consortium chain, consensus processing on transfers recently deployed in the consortium chain, and record a smart contract deployed by the transfer in the distributed database of the consortium chain after completing the consensus processing. The consensus algorithm supported by the consortium chain and the consensus processing performed by the consortium chain based on the consensus algorithm are not described in detail in the present specification, and a person skilled in the art can refer to descriptions in related technologies.

In the present specification, a smart contract that corresponds to the new asset type and deployed by the financial institution in the consortium chain can declare in advance an execution program related to the asset type corresponding to the smart contract. The execution program declared in advance can be carried in the code field of the contract object corresponding to the smart contract.

In an illustrated implementation, the execution program declared in the smart contract that corresponds to the new asset type and deployed by the financial institution in the consortium chain can include an execution program used to create an asset object and an execution program used to transfer an asset object. The user accessing the consortium chain can invoke an API interface provided by the consortium chain to deploy a transfer signed based on the held private key to the consortium chain, and invoke the execution program declared in the smart contract, to create virtual assets and complete online transfer of the held virtual assets.

In some implementation, in addition to the described execution programs used to create and transfer asset objects, the execution program declared in the smart contract that corresponds to the new asset type and deployed by the financial institution in the consortium chain can include other execution programs related to the asset object, for example, an execution program used to update an asset object. No enumeration is provided in the present specification.

3) Asset Object Creation

In the present specification, a user who requires access to a blockchain can pre-register with a consortium chain to obtain a public key and a private key returned by the consortium chain. After registration, the consortium chain can create a corresponding account object for the user.

In addition, a registered user can deploy, to the consortium chain by using an API interface provided by the consortium chain, a transfer that is signed based on the held private key and that is used to request to create an asset object.

After receiving the transfer deployed by the user based on the private key, a node device in the consortium chain connected to the registered user can first perform identity authentication on the user based on a public key corresponding to the private key held by the user. For example, in actual applications, a user can sign an initiated transfer based on a held private key, and a node device in a blockchain performs signature verification based on a public key corresponding to the private key held by the user. If signature verification succeeds, identity authentication on the user succeeds.

After identity authentication succeeds, consensus processing can be performed on transfers received within a period of time based on a consensus algorithm, and the transfer can be performed after consensus processing, to determine a type of an asset object that the user requests to create (the consortium chain may deploy a plurality of contract objects corresponding to different asset object types and the user can request to create a particular type of asset object).

For example, in an implementation, a type of an asset object that requests to be created can be declared in the transfer deployed by the user based on the held private key, and the node device receiving the transfer can determine, based on information declared in the transfer, the type of the asset object that the user currently requests to create.

After determining the type of the asset object that the user requests to create, the node device can further query a contract object that is deployed in the consortium chain and that corresponds to the type of the asset object that the user requests to create, and then can invoke, based on an invoking address of the contract object, an execution program that is declared in the contract object and that is used to create an asset object, to complete asset object creation.

For example, in an implementation, the transfer deployed by the user based on the held private key can further include parameters related to the asset object that requests to be created, for example, an asset amount that requests to be created. When invoking the previous contract object, the node device can transfer the parameters as invoking parameters to the execution program that is declared in the contract object and that is used to create an asset object, and the program can be invoked for execution to complete asset object creation.

In an illustrated implementation, after creating the asset object for the user by using the shown process, the node device can further add address information of the created asset object to a balance field of a target object holding the asset object.

A process of generating the address information of the previous asset object is not particularly limited in the present specification. For example, in an implementation, the address information of the asset object can be a hash value obtained by performing hash calculation on transfer content of the asset object that requests to be created.

In an illustrated implementation, a target object eventually holding the created asset object includes the following two cases:

In one case, the target object eventually holding the created asset object can be a target object that is specified by the user and that is used to hold the asset object.

For example, in implementation, the user can declare, in advance in a deployed transfer for requesting asset object creation, a target object that can hold a newly created asset object; or the user can notify, through offline notification, a financial institution that deploys the asset object of a specified target object holding the created asset object.

In another case, the target object eventually holding the created asset object can alternatively be the target object that is declared in the previous contract object in advance and that is used to hold the asset object. In other words, a target object that can hold an asset object created by invoking the contract object can be declared in the contract object in advance when the previous financial institution deploys the contract object.

For example, a whitelist of target objects that can hold an asset object created by invoking the contract object can be declared in the contract object in advance when the previous financial institution deploys the contract object. A target object that hits the whitelist can hold the asset object created by invoking the previous contract object.

In an illustrated implementation, an eventually held and created asset object can include any one of an account object, a contract object, and an asset object supported by the consortium chain. In other words, in the present specification, the account object, the contract object, and the asset object supported by the consortium chain can each hold the asset object. The created asset object can be specified by the user or can be declared in the contract object, and can be held by any one of the account object, the contract object, and the asset object.

For example, the user can specify asset object A as a target object holding created asset object B, and then can add address information of an asset object B to a balance field of an asset object A, to complete packet processing of the asset object A and the asset object B.

4) Asset Object Splitting and Transfer

In the present specification, a registered user can deploy a transfer used to request to create an asset object and signed based on a held private key to a consortium chain by using an API interface provided by the consortium chain, to initiate asset object creation. In addition, in actual applications, the user can deploy a transfer used to transfer an asset object and signed based on the held private key to the consortium chain by using the API interface, to transfer the held asset object through splitting.

After receiving the transfer deployed by the user based on the private key, a node device in the consortium chain connected to the registered user can first perform identity authentication on the user based on a public key corresponding to the private key held by the user. After the identity authentication succeeds, the node device can perform consensus processing on transfers received within a period of time based on a consensus algorithm, and perform the transfer after the consensus processing is completed, to determine an asset object that the user requests to split and transfer.

For example, in an implementation, the transfer deployed by the user based on the held private key can declare address information or other identification information of an asset object that the user requests to transfer, and a node device receiving the transfer can determine an asset object to be transferred that the user currently requests to transfer, based on the information declared in the transfer. After the node device determines the asset object to be transferred that the user requests to transfer, a contract object corresponding to an asset type of the asset object to be transferred can be invoked, to split the asset object to be transferred into a plurality of target asset objects.

In an illustrated implementation, the user can declare an asset object to be transferred and a splitting result for the asset object to be transferred requested by the user in a transfer. For example, the user can initiate a transfer in the blockchain, and request to split an asset A into an asset B asset and an asset C.

The contract object can declare an execution program and a splitting rule used to split an asset object in advance. The splitting rule can be some asset splitting conditions declared in the contract object. A person skilled in the art can customize specific content of the asset splitting conditions based on actual requests. For example, assuming that the user initiates the transfer in the blockchain, and requests to split the asset A into the asset B asset and the asset C, the asset splitting condition can be whether the total value of the asset B and the asset C obtained by splitting the asset A is equal to the asset A. If yes, the current splitting can be allowed; otherwise, the current splitting can be rejected.

Execution logic corresponding to the execution program used to split an asset object is not particularly limited in the present specification. A person skilled in the art can customize the execution logic based on actual requests. For example, in some cases, the execution program can be execution code such as an asset splitting condition declared in the code field of the contract object in advance.

In this case, when performing the transfer to split the asset object to be transferred, the node device can invoke the execution program declared in the contract object, to determine whether the splitting result for the asset object to be transferred requested by the user satisfies the splitting rule declared in the contract object.

For example, the splitting rule is a process that total value of a plurality of asset objects obtained through splitting requests to be the same as total value of an asset object to be split, to verify whether the splitting result satisfies the splitting rule, namely, a process of verifying whether the total value of the plurality of asset objects obtained through splitting is the same as that of the asset object to be split.

In the present specification, if the splitting result for the asset object to be transferred requested by the user in the transfer satisfies the splitting rule declared in the contract object, the node device can split the asset object to be transferred into the plurality of target asset objects based on the splitting result requested by the user. On the contrary, if the splitting result for the asset object to be transferred requested by the user in the transfer does not satisfy the splitting rule declared in the contract object, the node device can reject the transfer initiated by the user.

In another illustrated implementation, the user can alternatively declare an asset object to be transferred instead of a requested splitting result for the asset object to be transferred.

In this case, the splitting rule used to split an asset object declared in the contract object in advance can be some asset splitting methods declared in the contract object. A person skilled in the art can customize specific content of the asset splitting conditions based on actual requests. For example, the contract object can be a smart contract formulated by a plurality of member users in an example. In the smart contract, the plurality of member users can stipulate in advance a splitting method of splitting an asset object created by invoking the smart contract. For example, the users can stipulate a maximum quantity of asset objects obtained through splitting, or can stipulate that a quantity of asset objects obtained through splitting or values of them need to be the same, etc.

When performing the transfer to split the asset object to be transferred, the node device can invoke the execution program declared in the contract object, to automatically split the asset object to be transferred based on the splitting rule, and split the asset object to be transferred into the plurality of target asset objects in the splitting method stipulated in the contract object.

In the present specification, after the asset object to be transferred is split into the plurality of target asset objects, the node device can delete the asset object to be transferred, remove the address information of the asset object to be transferred from the balance field of the target object holding the asset object to be transferred, and add the address information of the plurality of target asset objects obtained through splitting to the balance field in the asset receiving objects corresponding to the plurality of target asset objects.

In the present specification, the user can transfer the held asset object in the consortium chain by initiating the transfer in the following two methods:

In an illustrated implementation, a transfer type used for virtual asset transfer can be described in the consortium chain, and the user can transfer, by initiating the described transfer type used for virtual asset transfer in the consortium chain, the asset object in the consortium chain without invoking the contract object.

In this scenario, after the asset object to be transferred is split into the plurality of target asset objects, the node device that performs the transfer removes the address information of the plurality of asset objects from the balance field of the target object holding the plurality of asset objects, and adds the address information of the target asset objects to the balance field in the asset receiving objects corresponding to the target asset objects.

In another illustrated implementation, an asset object can alternatively be transferred by the user by invoking a contract object corresponding to an asset type of the asset object. In this case, an execution program used to transfer an asset object can be declared in the contract object in advance, and a transfer rule is described in advance in the execution program.

The previous transfer rule can be some asset transfer conditions declared in the contract object. A person skilled in the art can customize specific content of the previous asset transfer condition based on actual requests. For example, the previous asset transfer condition can be that a user who initiates a transfer can complete asset object transfer when satisfying a specified user group requirement declared in the contract object.

Execution logic corresponding to the execution program used to transfer an asset object is not particularly limited in the present specification, and can be customized by a person skilled in the art based on actual requests. For example, in some cases, the execution program can be execution code such as an asset transfer condition declared in the code field of the contract object in advance.

When the user requests to transfer an asset object created by invoking the previous smart contract in the consortium chain, the user can initiate, to the contract object in the consortium chain, a transfer used to transfer an asset object, to serve as input of the contract object; then invoke, based on an invoking address of the contract object corresponding to the target asset object, an execution program declared in the contract object and used to transfer an asset object; and determine whether the transfer used to transfer an asset object and initiated by the user satisfies the transfer rule described in the previous execution program. If yes, the node device can immediately remove the address information of the asset object to be transferred from the balance field of the target object holding the asset object to be transferred, and add the address information of the plurality of target asset objects obtained through splitting to the balance field in the asset receiving objects corresponding to the plurality of target asset objects.

In an illustrated implementation, the asset receiving objects corresponding to the plurality of target asset objects can also include the following two cases:

In one case, the asset receiving objects corresponding to the target asset objects can be asset receiving objects that are specified by the user and that correspond to the target asset objects.

For example, in implementation, the user can declare the asset receiving objects corresponding to the plurality of target asset objects in advance in the deployed transfer used to request to transfer an asset object; or the user can notify a financial institution releasing the asset object of the asset receiving object corresponding to the target asset object through offline notification.

In another case, the asset receiving object corresponding to the target asset object can alternatively be an asset receiving object that is declared in the contract object in advance and that corresponds to the target asset object. In other words, when the previous financial institution deploys the contract object, the contract object can declare in advance a receiving object that can hold an asset object obtained through splitting when the asset object created by invoking the contract object is split and transferred.

In an illustrated implementation, the asset receiving objects corresponding to the plurality of target asset objects can include any one of an account object, a contract object, and an asset object supported by the consortium chain. In other words, in the present specification, a target asset object to be transferred can be transferred to the account object, the contract object, and the asset object supported by the previous consortium chain for holding.

A list of users having permission to invoke the contract object usually can be further declared in the previous contract object in some scenarios. Therefore, after receiving the transfer deployed by the user based on the private key, the node device in the blockchain can further authenticate whether the user has permission to invoke the contract object during identity authentication; determine that the user has permission to invoke the contract object if authentication succeeds; and then invoke the execution program declared in the previous contract object and used to create or transfer an asset object, to complete asset object creation and transfer.

For example, the list of users having permission to invoke the contract object declared in the previous contract object can be a list of public keys held by the user. After receiving the transfer deployed by the user based on the private key, the node device in the blockchain can perform identity authentication on the user based on a public key in the public key list. If authentication succeeds, it indicates that the user has permission to invoke the contract object.

In some implementation, in actual applications, the operation of verifying whether a user who submits transactions has a permission to invoke to invoke the contract object can further be implemented by using other methods in addition to performing identity authentication on the user based on a public key held by the user. No enumeration is provided in the present specification. It can be learned from the described implementation that in the present specification, the contract object corresponding to the asset object to be transferred specified by the user is invoked, the asset object to be transferred is split into the plurality of target asset objects, the address information of the asset object to be transferred is removed from the target object holding the asset object to be transferred, and the address information of the plurality of target asset objects obtained through splitting is added to the receiving object holding the plurality of target asset objects, to transfer the target asset objects, so that assets in the real world can be converted into digital assets in a blockchain to hold, and the assets can be split and transferred online based on the blockchain.

Figure 2:
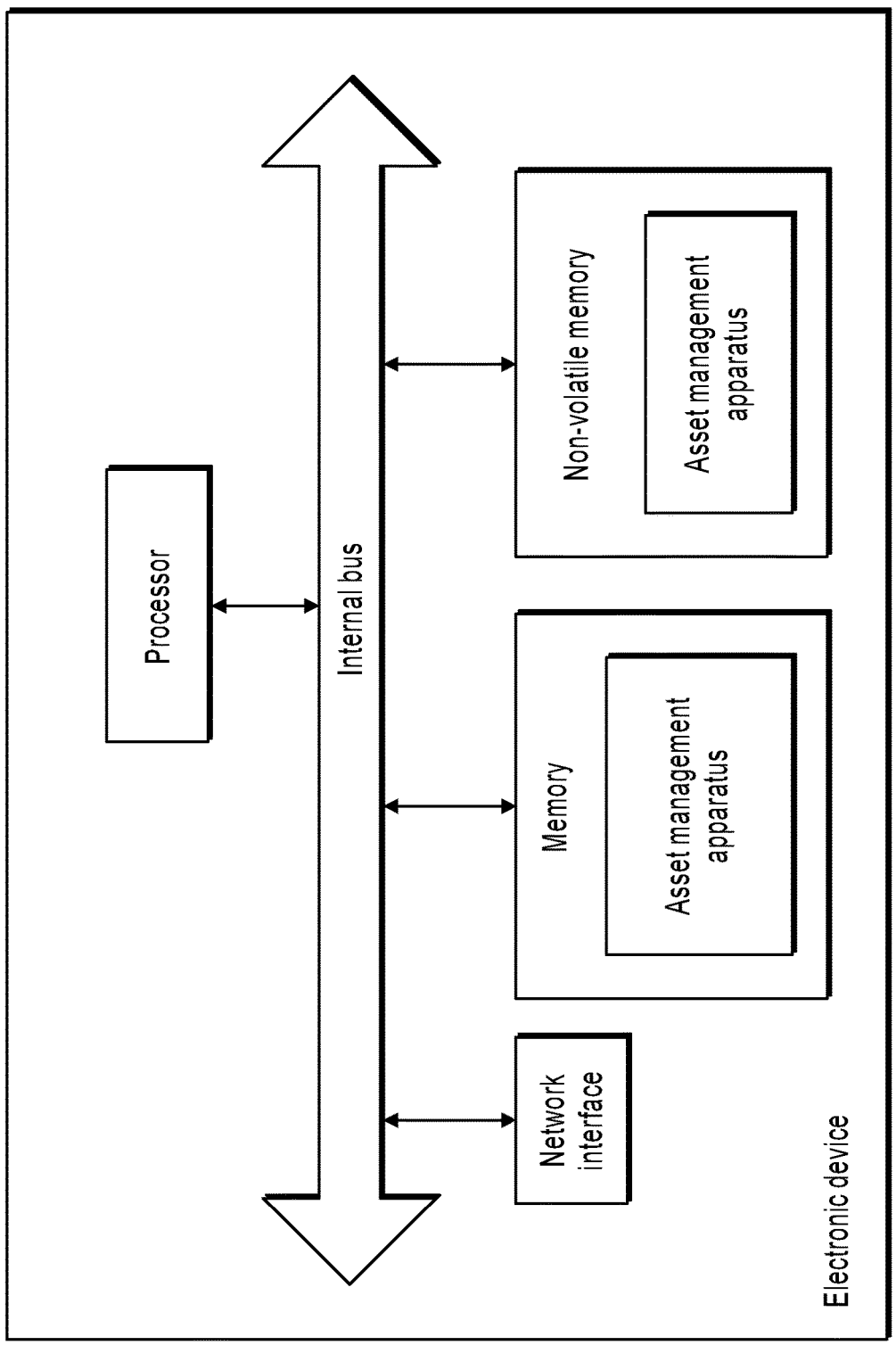
FIG. 2 is a schematic structural diagram illustrating an electronic device, according to an example implementation.

Corresponding to the method implementation, the present specification further provides an implementation of an asset management apparatus. The implementation of the asset management apparatus in the present specification can be applied to an electronic device. The apparatus implementation can be implemented by using software, or can be implemented by using hardware or a combination of hardware and software. In an example that the apparatus is implemented by using the software, a logical apparatus is obtained after a processor of an electronic device in which the apparatus is located reads a computer program instruction corresponding to a non-volatile memory for running. From a perspective of hardware, as shown in FIG. 2, FIG. 2 is a diagram of a hardware structure of an electronic device in which an asset management apparatus according to the present specification is located. In addition to a processor, a memory, a network interface, and a non-volatile memory shown in FIG. 2, the electronic device in which the apparatus in the implementation is located usually can include other hardware based on actual functions of the electronic device. Details are omitted here for simplicity.

Figure 3:
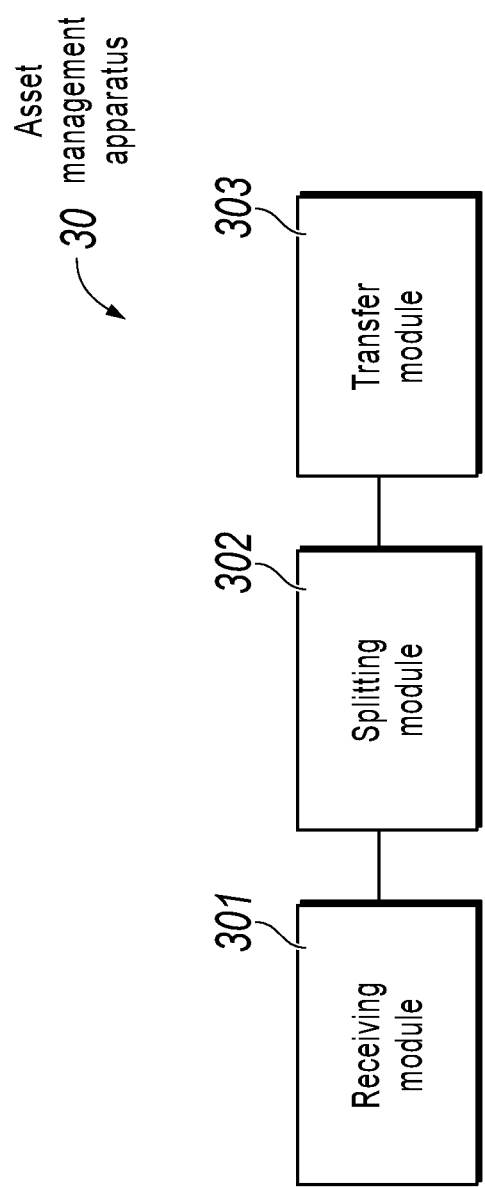
FIG. 3 is a block diagram illustrating an asset management apparatus, according to an example implementation.

FIG. 3 is a block diagram illustrating an asset management apparatus, according to an example implementation of the present specification.

Referring to FIG. 3, the asset management apparatus 30 can be applied to the electronic device shown in FIG. 2, and includes a receiving module 301, a splitting module 302, and a transfer module 303.

The receiving module 301 is configured to receive an asset object transfer request, where the asset object transfer request includes an asset object to be transferred.

The splitting module 302 is configured to: in response to the asset object transfer request, invoke a contract object that corresponds to an asset type of the asset object to be transferred and that is deployed in the blockchain, and split the asset object to be transferred into a plurality of target asset objects.

The transfer module 303 is configured to remove address information of the asset object to be transferred from a target object holding the asset object to be transferred, and add address information of the plurality of target asset objects to asset receiving objects corresponding to the plurality of target asset objects.

In the present implementation, the contract object declares an execution program and a splitting rule used to split an asset object.

The splitting module 302 is configured to: invoke the execution program declared in the contract object that corresponds to the asset type of the asset object and that is deployed in the blockchain, and split the asset object to be transferred into the plurality of target asset objects based on the splitting rule.

In the present implementation, the contract object declares an execution program and a splitting rule used to split an asset object, and the asset object transfer request further includes a splitting result for the asset object to be transferred requested by a user.

The splitting module 302 is configured to: invoke the execution program declared in the contract object that corresponds to the asset type of the asset object and that is deployed in the blockchain, and determine whether the splitting result for the asset object to be transferred requested by the user satisfies the splitting rule declared in the contract object; and if the splitting result satisfies the splitting rule declared in the contract object, split the asset object to be transferred into the plurality of target asset objects based on the splitting result requested by the user.

In the present implementation, the contract object declares an execution program used to transfer an asset object, and the asset object to be transferred is created by invoking the contract object.

The transfer module 303 is configured to: invoke the execution program declared in the contract object that corresponds to the asset type of the asset object to be transferred and that is deployed in the blockchain, and determine whether the asset object transfer request satisfies a predetermined transfer rule; and if the asset object transfer request satisfies the predetermined transfer rule, remove the address information of the asset object to be transferred from the target object holding the asset object to be transferred, and add the address information of the plurality of target asset objects to the asset receiving objects corresponding to the plurality of target asset objects.

In the present implementation, an object supported by the blockchain includes an address field, and the address field is used to maintain address information of an asset object held by the object. The transfer module 303 is configured to: remove the address information of the asset object to be transferred from an address field in the target object holding the asset object to be transferred, and add the address information of the plurality of target asset objects to address fields in the asset receiving objects corresponding to the plurality of target asset objects.

In the present implementation, an object supported by the blockchain further includes a code field, and the code field is used to maintain execution code related to an execution program declared in the object.

In the present implementation, the asset receiving objects corresponding to the plurality of target asset objects include: asset receiving objects that correspond to the plurality of target asset objects and that are specified by the user; or asset receiving objects that correspond to the plurality of target asset objects and that are declared in the contract object corresponding to the asset type of the asset object to be transferred.

In the present implementation, an object supported by the blockchain includes an account object, a contract object, and an asset object; and the asset receiving objects corresponding to the plurality of target asset objects include any one of an account object, a contract object, and an asset object.

In the present implementation, the blockchain is a consortium chain, and a target member in the blockchain is a consortium member having permission to create an asset object in the consortium chain.

For specific implementation processes of functions and roles of the modules in the apparatus, refer to implementation processes of corresponding steps in the method. Details are omitted here for simplicity.

Because an apparatus implementation basically corresponds to a method implementation, for related parts, refer to descriptions in the method implementation. The described apparatus implementation is merely an example. The modules described as separate parts can or cannot be physically separate, and parts displayed as modules can or cannot be physical modules, in other words, can be located in one position, or can be distributed in a plurality of network modules. Some or all of the modules can be selected based on actual requests to achieve the objectives of the solutions of the present specification. A person of ordinary skill in the art can understand and implement the implementations of the present specification without creative efforts.

The system, apparatus, or module described in the implementation can be implemented by a computer chip or an entity, or can be implemented by a product having a particular function. A typical implementation device is a computer, and the computer can be a personal computer, a laptop computer, a cellular phone, a camera phone, a smart phone, a personal digital assistant, a media player, a navigation device, an e-mail receiving and sending device, a game console, a tablet computer, a wearable device, or a combination thereof.

Corresponding to the method implementation, the present specification further provides an implementation of an electronic device. The electronic device includes a processor and a memory configured to store a machine executable instruction, and the processor and the memory are usually connected by using an internal bus. In another possible implementation, the device can further include an external interface, to communicate with another device or component.

In the present implementation, by reading and executing a machine executable instruction that is stored in the memory and that corresponds to control logic of asset management, the processor is configured to: receive an asset object transfer request, where the asset object transfer request includes an asset object to be transferred; and in response to the asset object transfer request, invoke a contract object that corresponds to an asset type of the asset object to be transferred and that is deployed on the blockchain, split the asset object to be transferred into a plurality of target asset objects, remove address information of the asset object to be transferred from a target object holding the asset object to be transferred, and add address information of the plurality of target asset objects to asset receiving objects corresponding to the plurality of target asset objects.

In the present implementation, the contract object declares an execution program and a splitting rule used to split an asset object.

By reading and executing a machine executable instruction that is stored in the memory and that corresponds to control logic of asset management, the processor is configured to: invoke the execution program declared in the contract object that corresponds to the asset type of the asset object and that is deployed in the blockchain, and split the asset object to be transferred into the plurality of target asset objects based on the splitting rule.

In the present implementation, the contract object declares an execution program and a splitting rule used to split an asset object, and the asset object transfer request further includes a splitting result for the asset object to be transferred requested by a user.

By reading and executing a machine executable instruction that is stored in the memory and that corresponds to control logic of asset management, the processor is configured to: invoke the execution program declared in the contract object that corresponds to the asset type of the asset object and that is deployed in the blockchain, and determine whether the splitting result for the asset object to be transferred requested by the user satisfies the splitting rule declared in the contract object; and if the splitting result satisfies the splitting rule declared in the contract object, split the asset object to be transferred into the plurality of target asset objects based on the splitting result requested by the user.

In the present implementation, the contract object declares an execution program used to transfer an asset object, and the asset object to be transferred is created by invoking the contract object.

By reading and executing a machine executable instruction that is stored in the memory and that corresponds to control logic of asset management, the processor is configured to: invoke the execution program declared in the contract object that corresponds to the asset type of the asset object to be transferred and that is deployed in the blockchain, and determine whether the asset object transfer request satisfies a predetermined transfer rule; and if the asset object transfer request satisfies the predetermined transfer rule, remove the address information of the asset object to be transferred from the target object holding the asset object to be transferred, and add the address information of the plurality of target asset objects to the asset receiving objects corresponding to the plurality of target asset objects.

In the present implementation, an object supported by the blockchain includes an address field, and the address field is used to maintain address information of an asset object held by the object.

By reading and executing a machine executable instruction that is stored in the memory and that corresponds to control logic of asset management, the processor is configured to: remove the address information of the asset object to be transferred from an address field in the target object holding the asset object to be transferred, and add the address information of the plurality of target asset objects to address fields in the asset receiving objects corresponding to the plurality of target asset objects.

A person skilled in the art can easily figure out another implementation of the present specification after considering the specification and practicing the present specification. The present specification is intended to cover any variations, functions, or adaptive changes of the present specification. These variations, functions, or adaptive changes comply with general principles of the present specification, and include common knowledge or a commonly used technical means in the technical field that is not disclosed in the present specification. The specification and the implementations are merely considered as examples, and the actual scope and the spirit of the present specification are described by the following claims.

It should be understood that the present specification is not limited to the earlier described accurate structures that are shown in the accompanying drawings, and modifications and changes can be made without departing from the scope of the present specification. The scope of the present specification is limited only by the appended claims.

The previous descriptions are merely example implementations of the present specification, but are not intended to limit the present specification. Any modification, equivalent replacement, or improvement made without departing from the spirit and principle of the present specification should fall within the protection scope of the present specification.

Figure 4:
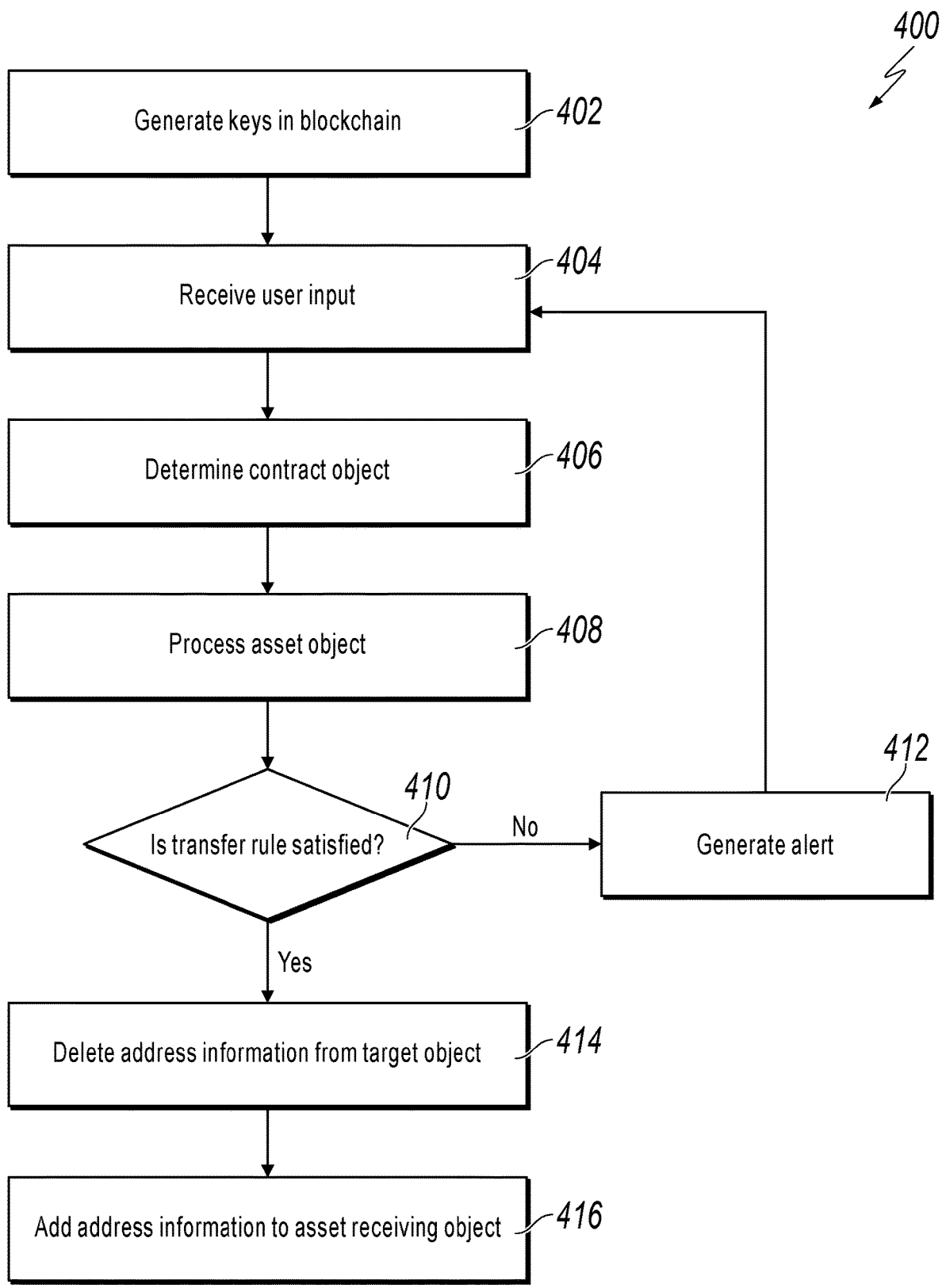
FIG. 4 is a flowchart illustrating an example of a computer-implemented method for asset management, according to an implementation of the present disclosure.

FIG. 4 is a flowchart illustrating an example of a computer-implemented method 400 for management of assets in a blockchain, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, keys are generated for a target user recorded in a distributed database of the blockchain network. The keys include a public key and a private key. In some implementations, the public key is associated with an account address of an institution in the blockchain. The private key can be configured to be used by the institution to operate the account. In some implementations, the blockchain network includes a consortium chain, and the target member (user) in the blockchain network is a consortium member that has asset object generation authority in the consortium chain. The blockchain network includes one or more account objects and one or more contract objects. The objects of the blockchain network (e.g., account objects, contract objects, target objects, and asset objects) include one or more fields. For example, the fields can include one or more of the following: the IP configuration for the target user; DNS logs from the target user, including events such as DNS lookups, changes to DNS settings, and so forth; network firewall logs (and/or other security-related log files) from the target user, including events such as blocked or allowed network communications, and so forth; operating system (OS) logs from the target user, including events associated with the OS; port settings on the target user; user access logs from the target user, including successful and/or unsuccessful user attempts to transfer assets from or to the target user; and/or user privilege data from the target user, including particular access privileges for various users on the target user. The fields can also include one or more of an entity name, entity ID, target user ID, OS version information, and software version(s) for installed software, network router information, other DNS settings, firewall settings, port settings, IP whitelist and/or blacklist settings, and so forth. From 402, method 400 proceeds to 404.

At 404, a user input is received from the target user. The user input includes a request to transfer an asset object. The asset object includes a digital asset corresponding to a physical asset associated with the target user. The request includes an asset type specified by the target user. The asset type can be indicated by an identifier that corresponds one of a plurality of different types of asset objects that can be deployed in the consortium chain. From 404, method 400 proceeds to 406.

At 406, in response to receiving the request, a contract object is determined based on an asset type of the asset object. The contract object includes a splitting rule that can be used to split the asset object. For example, the splitting rule can define a splitting process, through which a total value of a plurality of asset objects obtained through splitting is the same as the total value of an asset object to be split. The contract object can include an execution program configured to generate the target object and a code field that is used to maintain an execution code related to the execution program. From 406, method 400 proceeds to 408.

At 408, in response to receiving the request, the asset object is processed using the contract object to generate the target object. The target object includes an address field used to maintain address information of the plurality of asset objects by deploying a contract object corresponding to the asset type in the blockchain to create the target object. In some implementations, the target object generated through splitting is verified using the splitting rule. The verification process can include verifying whether the total value of the plurality of target objects obtained through splitting is equal to the value of the original asset object that was used for splitting. From 408, method 400 proceeds to 410.

At 410, a determination is made as to whether the asset transfer request satisfies a predetermined transfer rule. The predetermined transfer rule can include one or more parameters configured to protect the security and confidentiality of the target user and other users of the blockchain. For example, the transfer rule can include asset transference requirements defined by the contract object. The asset transference requirements can define parameters associated with the asset for transaction and the users that perform or are the recipients of the transaction. In some implementations, the user parameters can identify user groups associated with the objects of the blockchain. If it is determined that the asset transfer request does not satisfy the predetermined transfer rule, method 400 proceeds to 412. At 412, an alert is generated to indicate that the asset transfer request does not satisfy the predetermined transfer rule. From 412, method 400 returns to 404.

Otherwise, at 414, if it is determined that the asset transfer request satisfies the predetermined transfer rule, the address information of the asset object is deleted from the target object (e.g., a field of the target object) that holds the asset object. From 414, method 400 proceeds to 416.

At 416, the address information of the target object is added to an asset-receiving object that corresponds to the asset object. The asset-receiving object can be identified by the contract object based on the asset type of the asset object and can be associated to the target object (e.g., both asset-receiving object and target object belonging to a particular group of objects). After 416, method 400 stops.

Implementations of the present application can solve technical problems in managing assets in a blockchain. In some implementations, the blockchain is a distributed storage solution that provides immutable and tamper-resistant data transfer and storage, and the data is stored in a database of the blockchain in an encrypted form. Such security measures ensure that that system state data stored on the blockchain is not corrupted or altered by malicious processes. For example, an alteration of an asset-receiving object can be a tactic used by an attacker when a target user is compromised for fraudulent purposes, and storage of system state data on an immutable blockchain prevents the use of that tactic by an attacker. In some implementations, the blockchain headers from different payment applications across entities are cross-Merkelized or otherwise processed on the blockchain to further ensure the integrity of the data stored in the database of the blockchain.

In consideration of security and confidentiality, contract objects can be configured to perform privacy protection processing on the data associated with the asset object before generating the asset object and sending the address information to other platforms for processing. In addition, the asset transfer operation is configured such that it does not affect the overall data volume within the blockchain by deleting a data volume from a first location when adding the corresponding data volume in a second location. As such, the asset transfer operation does not lead to an exponential increase of data volume, which is a common problem associated with conventional methods of asset management.

Implementations of the present application provide methods and apparatuses for improving asset management. In some implementations, a processing platform (e.g., an payment processing server) obtains data that is to be validated and that corresponds to a predetermined feature from a data providing platform as a data group that is to be validated (e.g., a data group that corresponds to user transaction amounts). In addition, the processing platform can further obtain additional (e.g., historical) data associated with the asset that is to be validated by the predetermined transfer rule. The historical data may also corresponds to the same predetermined feature, and the comparison data group can be provided to a processing platform (e.g., a node of the blockchain network) for processing before the asset transfer. Then, the processing platform determines whether the asset transfer request satisfies the predetermined transfer rule. If the predetermined transfer rule is satisfied (e.g., there is no abnormal data), the processing platform can continue to transfer the asset. If the processing platform determines that there is abnormal data, the processing platform can start alerting, instruct related persons to analyze the cause of the data exception, and trigger related solutions.

In some implementations, the processing platform determines risk scores of asset transfers and transactions across multiple different entities, based on both transaction data for the transaction and system state data for the hosts involved in handling the transaction. The risk scores are examined to identify those transactions that are deemed high risk, with above-threshold scores. Such transactions can be blocked or queued for further examination in a case management system, for example. The system state data to be used for comparison, as well as the transaction data and risk score(s), can be stored on the blockchain that provides immutable, secure, and distributed data storage. Use of the blockchain facilitates the collection and analysis of a large amount of transaction data and system state data, which may grow over time as transaction traffic increases and/or transaction networks expand by adding more hosts to accommodate the increased traffic. Accordingly, through the use of a blockchain to store and analyze the data, implementations provide scalability with respect to the data extraction, analysis, and storage of the data. Moreover, because the blockchain is distributed across multiple network locations, implementations avoid the use of a centralized database for data storage and are therefore less vulnerable to corruption or deletion by malicious processes, in comparison to traditional, previously available risk analysis solutions that are vulnerable to attack at such a centralized storage hub.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

The invention claimed is:

1. A computer-implemented method for asset management, the computer-implemented method comprising:
   generating, by one or more processors, a public key and a private key for a target user device having a target user account recorded in a blockchain network that is distributed across multiple network locations;
   receiving, by the one or more processors and from the target user account, a user input comprising a request to transfer an asset object comprising a digital asset corresponding to a physical asset associated with the target user device, wherein the request comprises a demand to split the asset object into a plurality of target objects of a maximum quantity and a set size and is signed using the private key associated with the target user;
   in response to receiving the request, performing, by the one or more processors, an identity authentication of the target user device based on the public key corresponding to the private key;
   in response to performing the identity authentication, determining, by the one or more processors, a contract object based on an asset type of the asset object;
   processing, by the one or more processors, the asset object using the contract object to generate a plurality of target objects by using a splitting method predefined in the contract object, wherein each of the plurality of target objects comprises a corresponding address information;
   identifying, by the one or more processors, based on the contract object, asset receiving objects corresponding to the plurality of target objects;
   deleting, by the one or more processors, the corresponding address information from the plurality of target objects; and
   adding, by the one or more processors, the corresponding address information to the asset receiving objects corresponding to the plurality of target objects.

2. The computer-implemented method of claim 1, wherein the contract object comprises a declaration of an execution program and a splitting rule used to split the asset object in the plurality of target objects with a total value to be equal to an asset object total value.

3. The computer-implemented method of claim 2, wherein processing the asset object to generate the plurality of target objects comprises applying the splitting rule to the asset object.

4. The computer-implemented method of claim 2, wherein the contract object comprises a code field that is used to maintain an execution code related to the execution program.

5. The computer-implemented method of claim 1, wherein the blockchain network comprises a consortium chain, and the target user account in the blockchain network is a consortium member that has asset object generation authority in the consortium chain.

6. The computer-implemented method of claim 1, further comprising:
   determining whether the request satisfies a predetermined transfer rule; and
   in response to determining that the request satisfies the predetermined transfer rule, deleting the corresponding address information from the plurality of target objects and adding the corresponding address information to an asset receiving object that corresponds to the asset object.

7. The computer-implemented method of claim 1, further comprising generating for the target user a public key associated with an account address of an institution in the blockchain network and a private key configured to be used by the institution to operate an account corresponding to the account address.

8. A non-transitory, computer-readable medium storing one or more instructions executable by a computer system to perform operations comprising:
   generating a public key and a private key for a target user device having a target user account recorded in a blockchain network that is distributed across multiple network locations;
   receiving, from the target user account, a user input comprising a request to transfer an asset object comprising a digital asset corresponding to a physical asset associated with the target user device, wherein the request comprises a demand to split the asset object into a plurality of target objects of a maximum quantity and a set size and is signed using the private key associated with the target user;
   in response to receiving the request, performing an identity authentication of the target user device based on the public key corresponding to the private key;
   in response to performing the identity authentication, determining a contract object based on an asset type of the asset object;
   processing the asset object using the contract object to generate a plurality of target objects by using a splitting method predefined in the contract object, wherein each of the plurality of target objects comprises a corresponding address information;
   identifying based on the contract object, asset receiving objects corresponding to the plurality of target objects;
   deleting the corresponding address information from the plurality of target objects; and
   adding the corresponding address information to the asset receiving objects corresponding to the plurality of target objects.

9. The non-transitory, computer-readable medium of claim 8, wherein the contract object comprises a declaration of an execution program and a splitting rule used to split the asset object in the plurality of target objects with a total value to be equal to an asset object total value.

10. The non-transitory, computer-readable medium of claim 9, wherein processing the asset object to generate the plurality of target objects comprises applying the splitting rule to the asset object.

11. The non-transitory, computer-readable medium of claim 9, wherein the contract object comprises a code field that is used to maintain an execution code related to the execution program.

12. The non-transitory, computer-readable medium of claim 8, wherein the blockchain network comprises a consortium chain, and the target user account in the blockchain network is a consortium member that has asset object generation authority in the consortium chain.

13. The non-transitory, computer-readable medium of claim 8, wherein the operations further comprise:
   determining whether the request satisfies a predetermined transfer rule; and
   in response to determining that the request satisfies the predetermined transfer rule, deleting the corresponding address information from the plurality of target objects and adding the corresponding address information to an asset receiving object that corresponds to the asset object.

14. The non-transitory, computer-readable medium of claim 8, wherein the operations further comprise generating for the target user a public key associated with an account address of an institution in the blockchain network and a private key configured to be used by the institution to operate an account corresponding to the account address.

15. A computer-implemented system, comprising:
   one or more computers; and
   one or more computer memory devices interoperably coupled with the one or more computers and having tangible, non-transitory, machine-readable media storing one or more instructions that, when executed by the one or more computers, perform operations comprising:
      generating a public key and a private key for a target user device having a target user account recorded in a blockchain network that is distributed across multiple network locations;
      receiving, from the target user account, a user input comprising a request to transfer an asset object comprising a digital asset corresponding to a physical asset associated with the target user device, wherein the request comprises a demand to split the asset object into a plurality of target objects of a maximum quantity and a set size and is signed using the private key associated with the target user;
      in response to receiving the request, performing an identity authentication of the target user device based on the public key corresponding to the private key;
      in response to performing the identity authentication, determining a contract object based on an asset type of the asset object;
      processing the asset object using the contract object to generate a plurality of target objects by using a splitting method predefined in the contract object, wherein each of the plurality of target objects comprises a corresponding address information;
      identifying based on the contract object, asset receiving objects corresponding to the plurality of target objects;
      deleting the corresponding address information from the plurality of target objects; and
      adding the corresponding address information to the asset receiving objects corresponding to the plurality of target objects.

16. The computer-implemented system of claim 15, wherein the contract object comprises a declaration of an execution program and a splitting rule used to split the asset object in the plurality of target objects with a total value to be equal to an asset object total value.

17. The computer-implemented system of claim 16, wherein processing the asset object to generate the plurality of target objects comprises applying the splitting rule to the asset object.

18. The computer-implemented system of claim 16, wherein the contract object comprises a code field that is used to maintain an execution code related to the execution program.

19. The computer-implemented system of claim 15, wherein the blockchain network comprises a consortium chain, and the target user account in the blockchain network is a consortium member that has asset object generation authority in the consortium chain.

20. The computer-implemented system of claim 15, wherein the operations further comprise:
   determining whether the request satisfies a predetermined transfer rule;
   in response to determining that the request satisfies the predetermined transfer rule, deleting the corresponding address information from the plurality of target objects and adding the corresponding address information to an asset receiving object that corresponds to the asset object; and
   generating for the target user a public key associated with an account address of an institution in the blockchain network and a private key configured to be used by the institution to operate an account corresponding to the account address.

* * * * *